United States Patent [19]
Gale et al.

[11] Patent Number: 4,978,255
[45] Date of Patent: Dec. 18, 1990

[54] TAPPING FLUID SUPPLY PIPES

[76] Inventors: John C. Gale, Monkton Lea, Winterbourne Monkton, Swindon, Wiltshire; Howard J. Lang, 12 Lytchett Way, Nythe, Swindon, Wiltshire, both of England

[21] Appl. No.: 233,043

[22] Filed: Aug. 17, 1988

[51] Int. Cl.⁵ .............................................. B23B 41/08
[52] U.S. Cl. ...................................... 408/1 R; 137/15; 137/318; 408/72 B; 408/241 B
[58] Field of Search ............... 408/72 R, 72 B, 115 B, 408/241 B, 1 R; 137/318, 15

[56] References Cited

U.S. PATENT DOCUMENTS

| | | | |
|---|---|---|---|
| 3,293,952 | 12/1966 | Fairbanks | 408/1 R |
| 3,307,435 | 3/1967 | Floren | 137/318 |
| 3,460,553 | 8/1969 | Leopold, Jr. et al. | 137/318 X |

FOREIGN PATENT DOCUMENTS

| | | | |
|---|---|---|---|
| 235917A | 1/1987 | European Pat. Off. | 408/1 R |
| 1220973 | 1/1971 | United Kingdom . | |
| 2185916 | 8/1987 | United Kingdom | 408/1 R |
| 2196885 | 5/1988 | United Kingdom | 408/76 |

*Primary Examiner*—Steven C. Bishop
*Attorney, Agent, or Firm*—Watson, Cole, Grindle & Watson

[57] ABSTRACT

A fluid supply pipe (1) is drilled and tapped using a saddle (2) adhered to its surface, the drilling and tapping tools being attached to the saddle. The saddle (2) comprises a sole plate (3) snugly fitting on the pipe, and an upstanding collar (4) with a through bore (20) through which the cutting and tapping tools pass. During adhering the saddle to the pipe, adhesive is prevented from entering the bore (20) by provision of a closure member (21).

9 Claims, 5 Drawing Sheets

TAPPING FLUID SUPPLY PIPES

This invention relates to under pressure tapping of fluid supply pipes and particularly, but not exclusively, to tapping liquid-containing pipes such as water mains whilst the liquid is under pressure therein.

It is well known in the water industry to tap a water main whilst the main is operational, i.e. without turning off the water flow under pressure in the main. The known technique involves excavating to expose the main, and then cutting a hole in the main and tapping a screw thread therein. Tools have been developed whereby as the main is cut and tapped, water leakage can be avoided. One problem is to hold the tools in position against the mains pressure, and this is effected by excavating below the main and passing one or more chains or straps around the main, the tools being secured (directly or indirectly) to the chain(s) or strap(s) (see, for example, U.K. patent specification No. 1220973). It is possible in this way to hold the tools in position whilst they are exposed directly to the water pressure.

In European patent specification No. 235917A, published on 9th Sept. 1987, we have described using a saddle to hold the tools in position against mains pressure. These saddles comprise a sole plate for seating on the exterior surface of the pipe to be tapped, the plate having a circular aperture therein, and an annular wall member (or collar) upstanding from the plate around the aperture and defining with the aperture a through bore. In use, a saddle is firmly fixed to the pipe surface by adhesive between the sole plate and the pipe surface. Once the adhesive has properly cured, the drilling and tapping tool(s) are fixed to the saddle collar, and drilling and tapping can be effected through the saddle bore. There are a number of substantial advantages in using an adhesively mounted saddle and these are described more fully in the said European specification No. 235917A to which reference should be made.

In practice, it is important to ensure that there is sufficient adhesive present for substantially the whole of the sole plate to be adhered to the pipe surface, in order to maximise the adhesive bonding. It is difficult to avoid slight excesses of adhesive exuding into the collar of the saddle, and when this adhesive cures, it can interfere with the subsequent drilling and tapping operation. Thus, there is usually close tolerance between the bore diameter and the tool diameter, and the presence of cured adhesive on the bore wall can prevent the passage of a tool through the bore and/or generate frictional heat during operation of the tool which can result in damage.

We have now devised a way of overcoming this problem so that during adhesive bonding of the saddle to the pipe, adhesive is prevented from contacting the bore wall at the aperture in the sole plate.

In accordance with the present invention, the saddle is provided with closure means to close said bore at least around the periphery thereof at the aperture, to prevent adhesive entering the bore contacting the wall thereof, the closure means being removable after the adhesive has cured to re-open (or re-open fully) the bore.

In accordance with the invention, adhesive is prevented from entering the bore to lie on the wall thereof. This can be achieved either by completely closing the bore at the aperture, or alternatively by partially closing the bore with an annular member at the edge of the aperture. The central region of the aperture and bore would thus remain open but normally no adhesive could thereby reach the bore wall. However, we prefer to close the bore completely and the invention will hereafter be described with reference to this preferred procedure. It is to be understood however that, where the context allows, the same teaching is applicable mutatis mutandis to the use of an annular closure means to close the bore only around the periphery thereof at the aperture.

It is important that the closure means prevent adhesive entering the bore at the edge of the circular aperture in the sole plate, to lie on the bore wall. It is possible to use a closure means which seats in the bore itself, but we prefer to use a closure means which is applied on to the sole plate and completely covers the aperture therein. For example, a circular disc (or other plate-like member) can be used of greater size than the aperture, the disc being fixed on to the sole plate surface over the aperture, so that it closes the aperture and (as the saddle is adhered to the pipe) lies between the saddle and the surface of the pipe to be tapped.

When a disc or other such member is used in this way to close the bore, the disc should of course be thin so as not to interfere significantly with the required adhesive bonding between the rest of the sole plate and the pipe surface. Thicknesses of about 1 to 2 mm are preferred.

The material of which the disc can be made can vary widely provided that, of course, it is basically suitable for the intended purpose. Thus, metal or plastics discs are generally suitable, for example. As will be described hereinafter, in accordance with a particularly preferred feature of the invention, the material of the disc should be non-magnetic and plastics and metals such as aluminium (and alloys) are well suited to this purpose.

The disc or other plate must be so fixed on to the sole plate as to prevent adhesive passing into the sole plate aperture to lie on the wall of the bore. We prefer to use an adhesive to bond the disc on to the sole plate all around the aperture, but other fixing means which achieve the same result can be used.

The closure means must, of course, be properly located on the saddle before the saddle is adhered to the pipe. Such saddles, with a closure means in place, are novel and constitute an aspect of the present invention. Thus, the invention includes a saddle member for attachment to the exterior surface of a pipe for locating a drilling and tapping means with respect to the pipe, said saddle member comprising a sole plate for seating on the said pipe surface, the plate having a circular aperture therein, and an annular wall member upstanding from the plate around the aperture and defining with the aperture a through bore; characterised in that the saddle comprises closure means to temporarily close said bore at least around the periphery thereof at the aperture, said closure means being removable to re-open or re-open fully, the bore.

When a saddle of the invention (with its closure means in place) is to be adhered to the surface of the pipe to be tapped, the adhesive may be applied to either or both surfaces (pipe and/or sole plate) but it is usually most convenient to apply the adhesive only to the sole plate of the saddle. We prefer also to have adhesive on the closure means surface so that it is also adhered to the pipe. This improves the overall bonding.

Once a saddle of the invention has been adhered to the exterior surface of the pipe to be tapped, the closure means must be removed to allow access of the drilling and tapping tool to the pipe surface. There are various ways in which this can be effected, depending on the nature of the closure means used. We greatly prefer, however, to remove the closure means simply by operation of the pipe cutter (drill) itself as a preliminary to the cutter contacting the pipe surface. Thus, as the cutter is lowered through the bore in the saddle, it first meets and cuts the closure means before it reaches the pipe surface. It is thus preferred to use a relatively soft material (e.g. aluminium or an alloy thereof) for the closure means so that there is no problem over its removal by drilling. Removal in this way is of course destructive of the closure means but that is not important.

When a hole is cut in the wall of a pipe, the waste material, e.g. swarf and (when a hole saw is used) the cut coupon, can fall into the pipe and cause contamination or otherwise be a nuisance. In the case of concrete pipes, it is known to place a steel or iron plate on the pipe wall to be cut, and to have a magnet in the hole saw to attract the plate and thus prevent the cut coupon falling into the pipe. In accordance with a further aspect of the present invention, we have devised a way in which this general technique can be used on ferrous (cast iron or steel) pipes with the saddles of the invention, even though they comprise a closure member which prevents a magnet making direct contact with a cut coupon, for example. In accordance with a preferred feature of the present invention, a hole saw is used which has one or more high strength magnets therein, and the closure means of the saddle is such as not to substantially distort the magnetic field, i.e. it is nonmagnetic. In this way, the magnets, whilst spaced from the coupon, can still attract the ferrous waste material to prevent it entering the pipe, the waste being withdrawn with the hole saw and so removed from the cutting site.

In accordance with this aspect of the present invention, the or each magnet is preferably housed within the annulus of the hole saw blade, and may be a permanent or electromagnet. Preferably, the or each magnet is so mounted as to be biased in a direction axially forwardly of the cutter to take up the optimum position in use (i.e. as close as possible to the cut waste).

Whilst there are no special limits, the saddles of the present invention are intended to be of use primarily with water mains (or other pipes) of diameter from 12 to 54 inches (30 to 135 cm). In the majority of cases, the water mains will be from 12 to 15 inches (30 to 38 cm) in diameter.

It will be understood, and indeed it is explained in European specification No. 235917A, that the surfaces to be adhered (i.e. the exterior surface of the pipe, and the sole plate and preferably closure means) of the saddle) be clean and in sound condition. Suitable adhesives are commercially available. The saddles themselves may have a curved sole plate to match the curvature of the pipe with which they are to be used. Such saddles can be made as castings. Alternatively, they can have a flexible metal sole plate, for example, whose shape can then be conformed to that of the pipe in use. The sole plate must fit snugly on the pipe surface if satisfactory adhesion is to be obtained. In the saddles of the invention, the longitudinal axis of the through bore will usually be orthogonal to the pipe on which the saddle is used (i.e. also generally orthogonal to the sole plate). Where a plate (e.g. disc) closure means is used, this may be flexible or it may for example be preformed of the appropriate cylindricality to fit snugly on the sole plate over the aperture if the curvature so requires.

In order that the invention may be more fully understood, reference is made to the accompanying drawings, in which:

FIGS. 1a, 1b, 1c and 1d schematically illustrate one embodiment of the method of the invention;

Figure 1A:
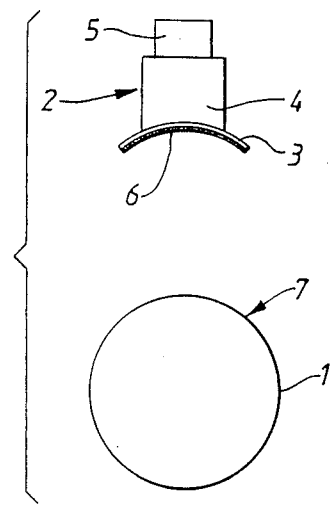

Referring to FIG. 1 of the drawings, the method of tapping a pipe under pressure is schematically illustrated. In FIG. 1(a), there is shown (in schematic section) the pipe 1 with fluid contents (not shown) under pressure therein, and above the pipe, a saddle 2 of the invention. The saddle (examples of which are described in more detail hereafter) essentially comprises a curved sole plate 3 of the same curvature as the outer surface of pipe 1, and a cylindrical upstanding collar 4 through which is a longitudinal bore terminating at an aperture (not shown) in sole plate 3. At the upper end of collar 4 is a threaded flange 5 for connnecting with the saw and tapping tools. On the underside of the sole plate is a disc (not shown) overlying the aperture and closing the bore. On the sole plate and disc outer surfaces is adhesive 6 for bonding the saddle to the cleaned and prepared surface area 7 on pipe 1.

Figure 1B:
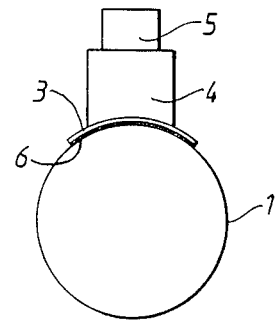

The saddle is placed on surface area 7 of pipe 1 (FIG. 1(b)) and the adhesive allowed to cure. After curing, a valve 8 is secured to flange 5, and via screw threaded connector 9, a cutting and tapping tool 10 is connected to the valve 8 (FIG. 1(c)). The valve 8, flange 5, and connector 9 are all such that the working parts of tool 10 can pass therethrough to engage the pipe 1. After testing the adequacy of the adhesive bonding of the saddle, a hole saw part of tool 10 is passed down into collar 4 to rest on the disc closing the bore. Cutting commences and the disc, being of thin (1mm) aluminium sheet, is quickly cut away so that the saw bears on surface area 7 of pipe 1. A hole is cut and magnets in the saw retain the coupon and swarf which are withdrawn with the saw. A tapping tool is now passed through collar 4 to form a screw thread on the cut wall of pipe 1. Finally, a ferrule or plug (11) is screwed into the tapped hole and valve 8 is closed, and tool 10 removed (FIG. 1(d)). Thus, pipe 1 has been tapped and can be accessed through valve 8 as desired. For example, a flowmeter can be screwed into the tapping to monitor water flow in pipe 1.

Figure 1C:
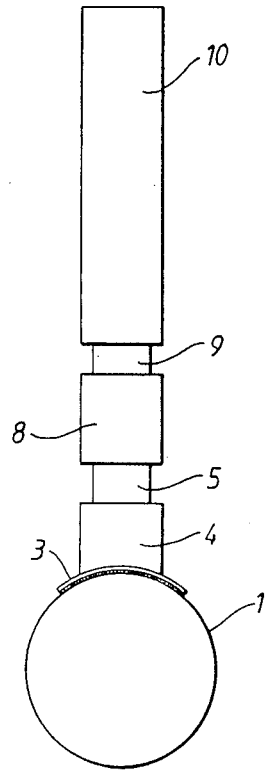
Figure 1D:
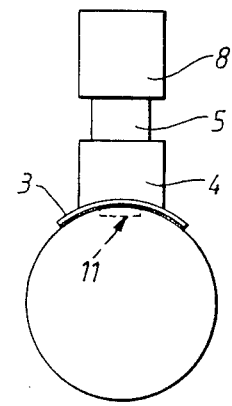
Figure 2:
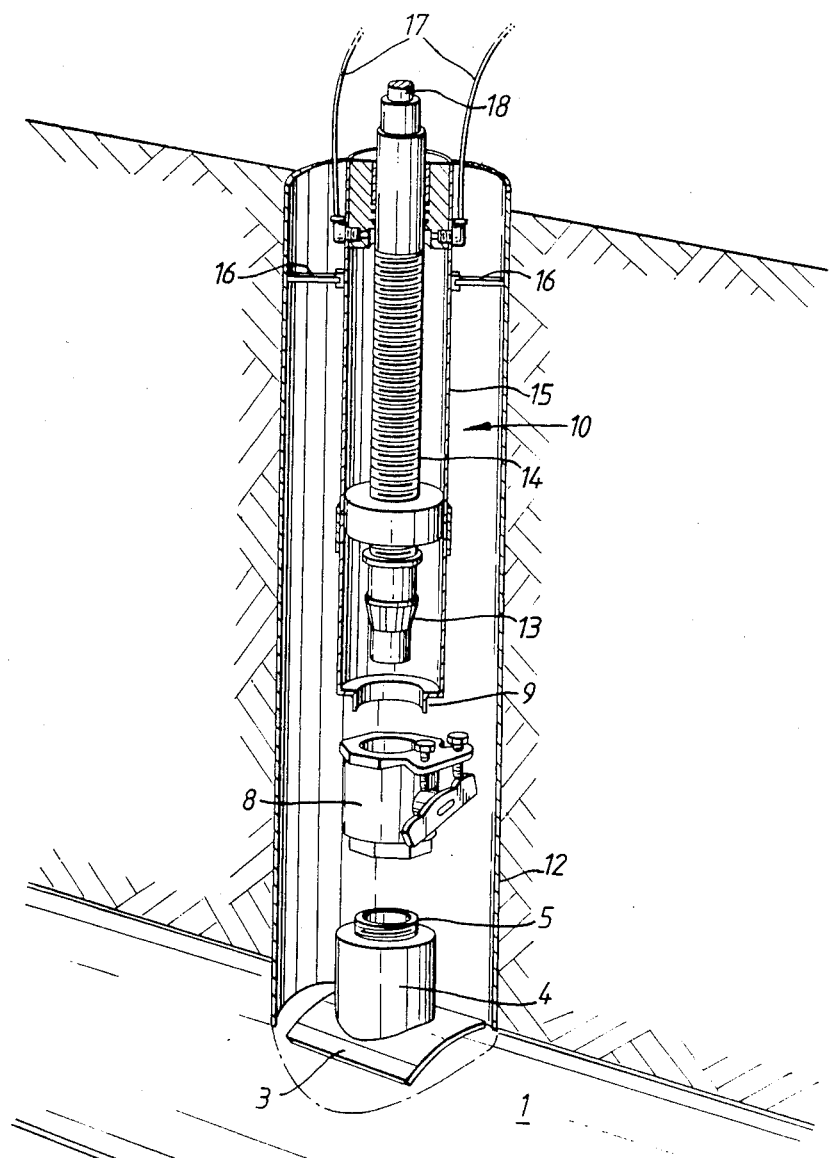
FIG. 2 is a part cut-away, part exploded orthogonal view of the arrangement in FIG. 1(c)

FIG. 2 is a part cut-away, part exploded orthogonal view of the arrangement of FIG. 1(c), but in more detail. Like numerals indicate like parts. Here, the pipe 1 is subterranean, and a guide tube 12 is provided in the excavation. The tool 10 includes tool housing 15, a tapping head 13, a feed screw 14 and drill shaft 18. Bars 16 locate tool 10 in guide tube 12. Water feed pipes 17 are for pressure testing the adhesion of the saddle to the pipe.

Figure 3:
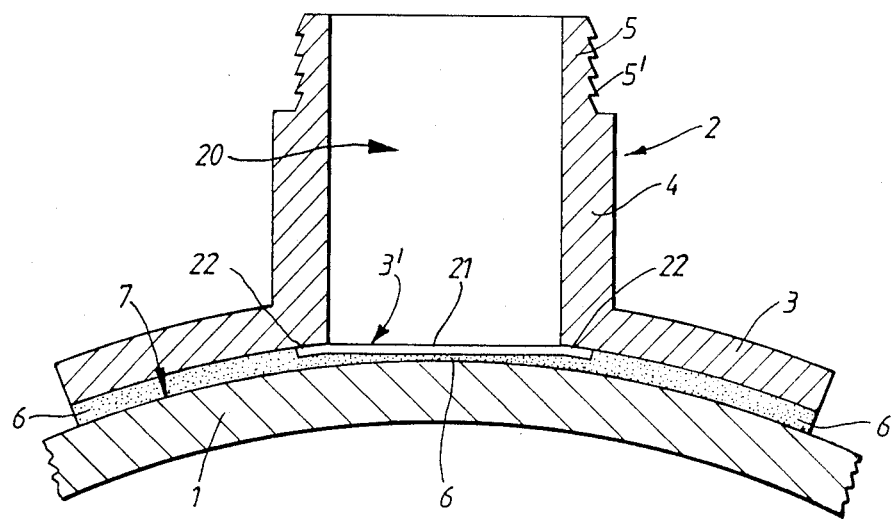
FIG. 3 is a sectional view of a saddle of the invention adhering to a pipe (FIG. 1(b))

Referring now to FIG. 3, like numerals to those in FIGS. 1 and 2 indicate like parts. FIG. 3 is an enlargement of FIG. 1(b) in section. Saddle 2 comprises sole plate 3 having aperture 3', and collar 4, together providing a through bore 20. Thin aluminium disc 21 is slightly larger than the aperture 3' (i.e. than the crosssection of bore 20) and completely closes the bore. The disc 21 is adhered to the sole plate 3 at the annular peripheral region 22. The sole plate and outer surface of disc 21 are coated in adhesive 6 and positioned on prepared surface 7 of pipe 1. Upstanding flange 5 has outer screw thread 5' thereon.

Figure 4:
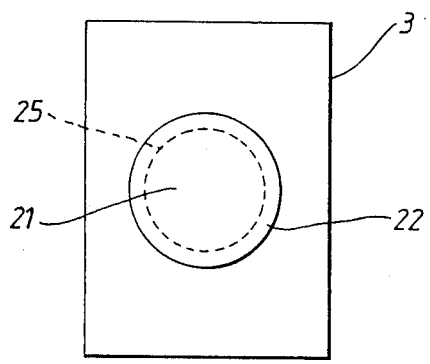
FIG. 4 is a bottom plan view (on a different scale) of the saddle of FIG. 3.

FIG. 4 shows a bottom plan view of the saddle of FIG. 3, and illustrates disc 21 and annular region 22 where the disc is adhered to sole plate 3. Discontinuous line 25 shows the periphery of aperture 3'.

Figure 5:
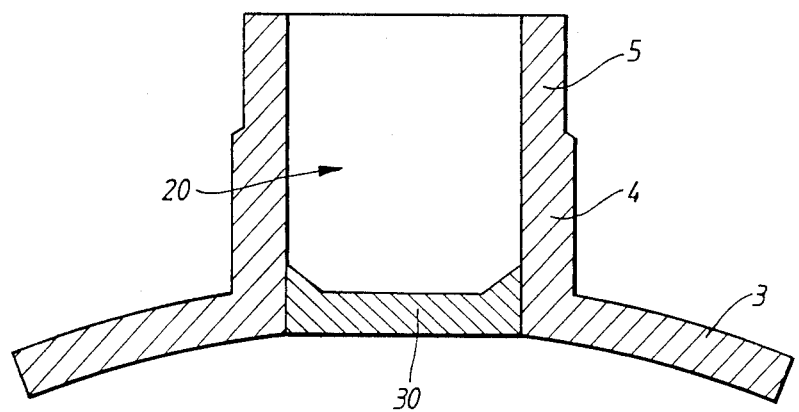
FIGS. 5 and 6 are section views of the same basic saddle as shown in FIG. 3 but with different closure means.
Figure 6:
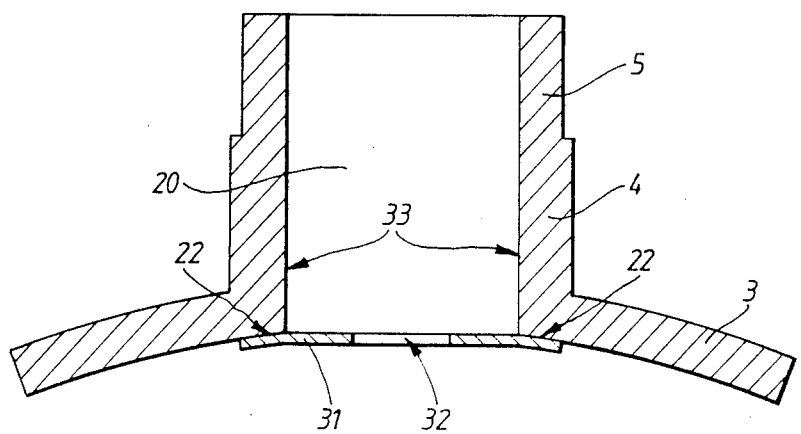

FIGS. 5 and 6 (in which like numerals to FIGS. 1 to 4 indicate like parts) show two different types of closure means. In FIG. 5, the closure means is a plug 30 which is received wholly within bore 20. In FIG. 6, an annular closure member 31 is shown. This is adhered to the sole plate 3 in an overlap region 22, but unlike disc 21 (FIG. 3) it does not completely close bore 20. The central hole 32 in annular member 31 maintains the bore open. However, when the saddle is adhered to a pipe, although adhesive may enter the bore through hole 32, it will normally not reach the bore wall 33.

Figure 7:
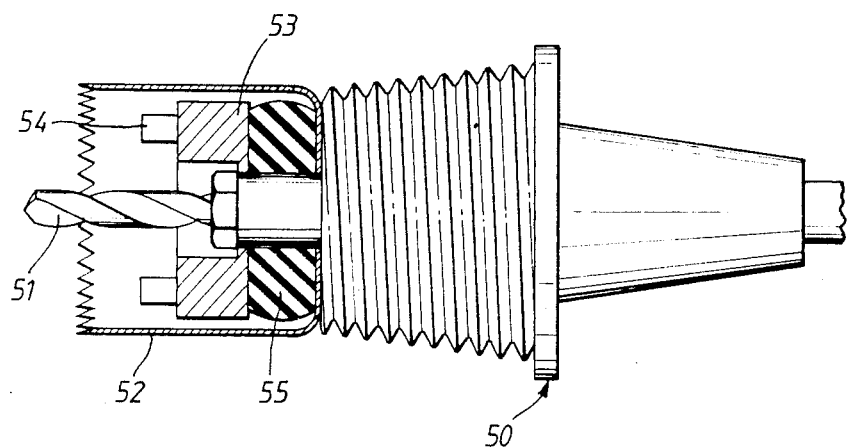
FIG. 7 is a view, partly in axial section, of a hole saw incorporating magnets and useable in accordance with the present invention.

Referring to FIG. 7 the hole saw 50 comprises an annular saw band member 52 and a coaxial centre drill 51 (this is optional) mounted for drilling rotation in a conventional manner (not detailed). Around the centre drill 51, within the confines of the hole saw member 52, is positioned a carousel 53 which is preferably free to rotate around the centre drill and is retained on a shaft on which it rotates. On the carousel are positioned a number of equispaced high strength magnets 54 fixed on a common pitch circle diameter. A piece of soft rubber or a spring 55 is fitted to the carousel retaining shaft at a point between the carousel and the back of the hole saw member 52. The flexible spring or rubber (or other equivalent arrangement) allows the carousel to slide up and down the retaining shaft. As the wall thickness of different size pipes can obviously vary, then the carousel will need to position itself in dependence on any particular wall thickness. The spring loading offers a bias towards the magnets making contact with the metal pipe. The carousel may also need a spacer or screw adjustment to suit more extreme variations of pipe size and thickness.

We claim:

1. In a method of tapping a pipe of ferrous material whilst the pipe contents remain under pressure therein, which comprises: (1) adhering to the pipe a saddle member comprising a sole plate with a layer of adhesive for seating on the pipe surface, the plate having a circular aperture therein, and an annular wall member upstanding from the plate around the aperture and defining with the aperture a through bore;

(2) securing to the adhered saddle means for cutting and tapping the pipe; and (3) cutting and tapping the pipe through the bore; the improvement which comprises using in step (1) a saddle which includes closure means with an adhesive layer contiguous with the layer of adhesive on the sole plate for closing said bore at least around the periphery thereof at the said aperture to prevent adhesive from entering the bore, and wherein in step (3) said closure means are removed by means for reopening the bore, said reopening means including at least one magnet to retain ferrous waste released during removal of said closure means.

2. A method according to claim 1 wherein, in step (3), the reopening means comprises a hole saw pipe cutter being used to cut the pipe.

3. A method according to claim 1, wherein the closure means is of non-magnetic material.

4. A method according to claim 3, wherein the closure means is a thin aluminium or aluminium alloy plate.

5. A saddle member for attachment to the exterior surface of a ferrous pipe for locating a cutting and tapping means with respect to the pipe, said saddle member comprising a sole plate with a layer of adhesive for seating on the said pipe surface, the plate having a circular aperture therein, and an annular wall member upstanding from the plate around the aperture and defining with the aperture a through bore; and wherein the saddle also comprises closure means with an adhesive layer contiguous with the layer of adhesive on the sole plate to close said bore at least around the periphery thereof at the aperture, said closure means being removable by means for reopening the bore, said reopening means including at least one magnet to retain ferrous waste released during removal of said closure means.

6. A saddle according to claim 5, wherein the closure means is a thin plate member secured to the sole plate to overlie the aperture.

7. A saddle according to claim 6, wherein the thin plate member completely closes the bore by covering the whole aperture.

8. A saddle according to claim 5, wherein the plate is of non-magnetic material.

9. A saddle according to claim 8, wherein the plate is of aluminium or aluminium alloy.

* * * * *

UNITED STATES PATENT AND TRADEMARK OFFICE
CERTIFICATE OF CORRECTION

PATENT NO. : 4,978,255

DATED : December 18, 1990

INVENTOR(S) : John C. Gale et al.

It is certified that error appears in the above-identified patent and that said Letters Patent is hereby corrected as shown below:

On the title page, between "[22] Filed:  Aug. 17, 1988" and "[51] Int. Cl$^5$ ............B 23 B 41/08" insert --[30]   Foreign Application Priority Data Aug. 19, 1987  [GB]  Great Britain ......................8719594--.

Signed and Sealed this

Nineteenth Day of May, 1992

Attest:

DOUGLAS B. COMER

*Attesting Officer*       Acting Commissioner of Patents and Trademarks